United States Patent [19]
Busch et al.

[11] Patent Number: 5,284,360
[45] Date of Patent: Feb. 8, 1994

[54] PIVOTABLE ROLLOVER BAR FOR MOTOR VEHICLES

[75] Inventors: Gerhard Busch, Gechingen; Rolf Kimmerle, Walddorfhäslach, both of Fed. Rep. of Germany

[73] Assignee: Mercedes-Benz AG, Stuttgart, Fed. Rep. of Germany

[21] Appl. No.: 944,322

[22] Filed: Sep. 14, 1992

[30] Foreign Application Priority Data

Sep. 13, 1991 [DE] Fed. Rep. of Germany ....... 4130470

[51] Int. Cl.$^5$ ................................................ B60R 21/13
[52] U.S. Cl. ..................................... 280/756; 296/107
[58] Field of Search ................. 280/756, 751, 753; 296/107, 102

[56] References Cited

U.S. PATENT DOCUMENTS

| | | | |
|---|---|---|---|
| 2,013,314 | 9/1935 | Metz | 296/107 |
| 2,111,885 | 3/1938 | Cambessedes | 296/107 |
| 2,623,779 | 12/1952 | Catell | 296/107 |
| 3,195,947 | 7/1965 | White | 296/107 |
| 4,666,183 | 5/1987 | Azzarello | 280/756 |
| 4,708,389 | 11/1987 | Maebayashi et al. | 280/756 X |
| 4,830,402 | 5/1989 | Matthias et al. | 280/756 |
| 4,840,398 | 6/1989 | Matthias et al. | 280/756 |
| 5,042,835 | 8/1991 | Burns | 280/756 |
| 5,056,816 | 10/1991 | Lütze et al. | 280/756 X |
| 5,066,040 | 11/1991 | Dangl et al. | 280/756 |
| 5,090,764 | 2/1992 | Kogawa et al. | 296/107 |
| 5,094,478 | 3/1992 | Pfanzeder et al. | 280/756 |

FOREIGN PATENT DOCUMENTS

| | | | |
|---|---|---|---|
| 0454279 | 10/1991 | European Pat. Off. | 280/756 |
| 0796993 | 4/1936 | France | 296/107 |

*Primary Examiner*—Margaret A. Focarino
*Assistant Examiner*—Florian Zeender
*Attorney, Agent, or Firm*—Evenson, McKeown, Edwards & Lenahan

[57] ABSTRACT

A pivotable rollover bar for motor vehicles, in particular for four-seater convertibles, which, bent in the shape of a U, surrounds the rear seating area of a passenger compartment in a lowered rest position. The rollover bar can be pivoted by a drive about lateral bearings on a vehicle body, about a transverse axis of the vehicle, into a raised operative position in which its crossbar spans the interior of the passenger compartment. The rollover bar is provided on its lateral limbs with a flattened portion on the side facing the interior of the passenger compartment, this flattened portion enlarging the interior or the passenger compartment at the sides of the seat. At least one supporting tube projects from the rollover bar towards the vehicle body, the supporting tube being displaceable together with the rollover bar and being guided in a guide in the vehicle body and positioned to take up forces in the transverse direction of the vehicle.

9 Claims, 1 Drawing Sheet

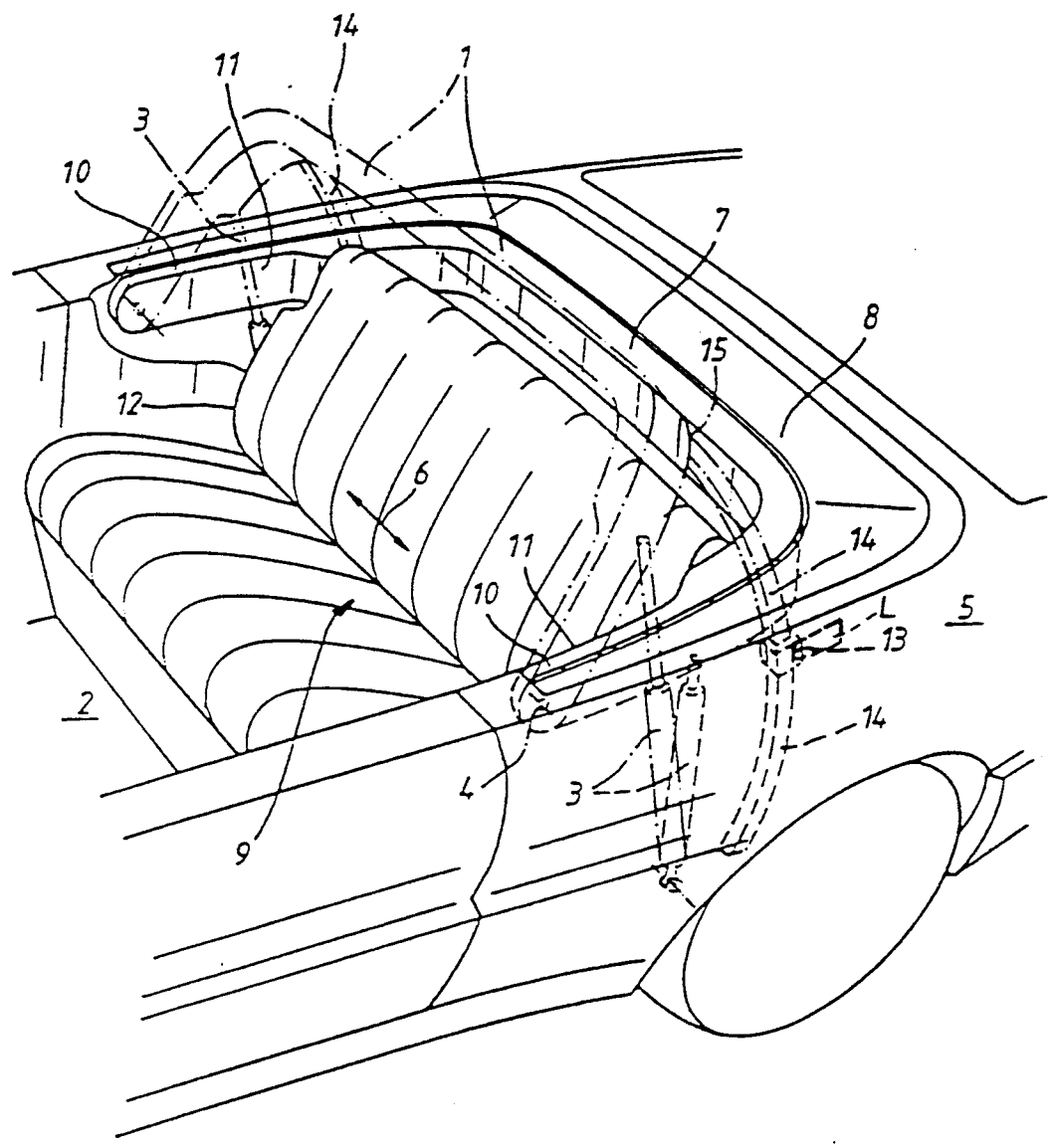

PIVOTABLE ROLLOVER BAR FOR MOTOR VEHICLES

BACKGROUND AND SUMMARY OF THE INVENTION

The invention relates to a pivotable rollover bar assembly for motor vehicles, in particular for four-seater convertibles, comprising a rollover bar curved in the shape of a U to surround a rear seating area of a passenger compartment in a lowered rest position and drive apparatus for raising the rollover bar to its raised operative position in which its crossbar spans the interior of the passenger compartment.

It is known from the field of motor vehicle construction, particularly in the case of vehicles without a rigid top, to arrange a U-shaped rollover bar on the vehicle body. In its operative position, the rollover bar spans the passenger compartment starting from a side edge of the vehicle and thus protects persons sitting in the vehicle from direct contact with the ground if the vehicle rolls over. A rollover bar of this kind is illustrated, for example in German Patent 3,410,676.

This rollover bar must be able to provide high supporting forces with its lateral limbs and with its crossbar. For this reason, the cross-section of the rollover bar is large. However, this has the effect that the interior of the vehicle, and, especially, the shoulder space for the person sitting between the limbs of the lowered rollover bar, is restricted.

An object on which the invention is based is to create more interior space for the seated persons in a motor vehicle with a rollover bar of the generic type.

This object is achieved according to preferred embodiments of the invention by providing an arrangement wherein the rollover bar is provided on its lateral limbs with a flattened portion on the side facing the interior of the passenger compartment, this flattened portion enlarging the interior of the passenger compartment at the sides of the seat, and wherein at least one supporting tube projects from the rollover bar towards the vehicle body, said at least one supporting tube being displaceable together with the rollover bar and being guided in a guide in the vehicle body and serving to absorb forces acting on the rollover bar in the transverse direction of the vehicle.

The pivotable rollover bar is bent or curved in the shape of a U and surrounds the rear seating area of the passenger compartment in a lowered rest position. The rollover bar can be pivoted by a drive unit up about lateral bearings on the vehicle body about a transverse axis of the vehicle, into a raised operative position in which it spans the passenger compartment with a crossbar. The rollover bar has lateral limbs with flattened portions of narrow design to the side of the rear seat backs and these enlarge the interior of the passenger compartment at the sides of the seat. To ensure that these flattened portions on the lateral limbs do not lead to any loss in rigidity in the rollover bar in the event of a rollover, at least one supporting tube displaceable together with the rollover bar and taking up forces at least in the transverse direction of the vehicle projects from the rollover bar towards the vehicle body.

In an easily constructed embodiment of the invention, this supporting tube is in the form of a circular arc in its longitudinal direction, in conformance with the movement of the point of connection to the rollover bar, and can slide in a guide which closely surrounds the supporting tube.

The supporting tube can also serve to support the rollover bar in its operative position if the supporting tube can be locked in this position by customary latching means, according to preferred embodiments of the invention.

Other objects, advantages and novel features of the present invention will become apparent from the following detailed description of the invention when considered in conjunction with the accompanying drawings.

BRIEF DESCRIPTION OF THE DRAWINGS

The single drawing figure schematically shows the rear of a motor vehicle with a pivotable rollover bar, constructed according to a preferred embodiment of the invention.

DETAILED DESCRIPTION OF THE DRAWINGS

The rollover bar 1 is bent or curved in a U shape and is illustrated with a solid line in a lowered rest position, in which the rollover bar 1 surrounds a rear seating area of a passenger compartment 2. In the event of an accident, the rollover bar 1 can be pivoted out of this rest position about lateral bearings 4 on the vehicle body 5 and about an axis extending in the transverse direction 6 of the vehicle into a raised operative position, represented in the drawing by a chain-dotted line, by a drive 3 which is here formed by hydraulic piston-cylinder units on both sides. In this operative position, a crossbar 7 of the rollover bar 1 spans the passenger compartment 2, the vehicle occupants thus being protected in the event of a rollover.

Since the rollover bar 1 must be arranged to the inside of a folding-top compartment lid 8, there is not sufficient space for it within the side wall of the vehicle body 5 due to the cross-section which it must have to ensure transverse rigidity. For this reason, the rollover bar 1 has an elongated flattened portion 11 on each of its lateral limbs 10 on the side facing the interior 9 of the passenger compartment, this flattened portion enlarging the interior 9 of the passenger compartment at the sides 12 of the seat.

In order to guarantee that the rollover bar 1 can nevertheless reliably support the vehicle in the event of a rollover, there are two supporting tubes 14, displaceable together with the rollover bar 1 and each supported in the transverse direction 6 of the vehicle in a guide 13 on the vehicle, projecting from the rollover bar 1.

In an easily constructed embodiment, the supporting tube 14 is in the form of a circular arc in its longitudinal direction, in accordance with the movement of a point 15 of connection to the rollover bar 1 and is guided in sliding fashion in a close-fitting guide 13.

This supporting tube 14 can also provide additional support for the rollover bar 1 against folding down under the large loads encountered during a rollover, if it is capable of being locked in its extended position by customary latching means in the raised operative position of the rollover bar 1.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Pivotable rollover bar assembly for motor vehicles, in particular for four-seater convertibles, comprising
a rollover bar curved in the shape of a U having a transverse portion and a pair of lateral limbs to surround a rear seating area of a passenger compartment in a lowered rest position,
lateral bearings for pivotally supporting the rollover bar to be movable about a transverse axis of the vehicle, and
a drive apparatus for moving the rollover bar between the lowered rest position to a raised position spanning the interior of the passenger compartment,
wherein the rollover bar is provided on each of said pairs of lateral limbs a flattened portion on a side facing the interior of the passenger compartment, these flattened portions enlarging the interior of the passenger compartment at the sides of a seat as compared with a rollover bar without such flattened portions a cross sectional width of each of said pair of lateral limbs measured through the flattened portion being less than a cross sectional width of each of said pair of lateral limbs measured through a non-flattened portion, and wherein at least one supporting tube projects from the rollover bar towards the vehicle body, said at least one supporting tube being displaceable together with the rollover bar and being guided in a guide in the vehicle body and serving to absorb forces acting on the rollover bar primarily in the transverse direction of the vehicle.

2. Pivotable rollover bar assembly for motor vehicles according to claim 1, wherein the at least one supporting tube is in the form of a circular arc with respect to an axis extending transversely from a point of connection of the supporting tube to the rollover bar, downwardly into the guide in the vehicle body when the rollover bar is in its raised position.

3. Pivotable rollover bar assembly for motor vehicles according to claim 1, comprising a lock device for locking the supporting tube in the raised position of the rollover bar.

4. Pivotable rollover bar assembly for motor vehicles according to claim 2, comprising a lock device for locking the supporting tube in the raised position of the rollover bar.

5. Pivotal rollover bar assembly for motor vehicles according to claim 1, wherein the said at least one supporting tube includes a pair of supporting tubes connected at respective opposite lateral sides of the rollover bar.

6. Pivotal rollover bar assembly for motor vehicles according to claim 1, wherein said flattened portions extend from respective connections for the rollover bar rearwardly to at least a rear seat back when the rollover bar is in its lowered position.

7. Pivotable rollover bar assembly for motor vehicles according to claim 2, wherein said flattened portions extend from respective connections for the rollover bar rearwardly to at least a rear seat back when the rollover bar is in its lowered position.

8. Pivotable rollover bar assembly for motor vehicles according to claim 3, wherein said flattened portions extend from respective connections for the rollover bar rearwardly to at least a rear seat back when the rollover bar is in its lowered position.

9. Pivotable rollover bar assembly for motor vehicles according to claim 5, wherein said flattened portions extend from respective connections for the rollover bar rearwardly to at least a rear seat back when the rollover bar is in its lowered position.

* * * * *